Nov. 28, 1933.  R. R. PITTMAN  1,937,166
PROTECTIVE SYSTEM FOR TRANSMISSION LINES
Filed Nov. 28, 1932  2 Sheets-Sheet 1
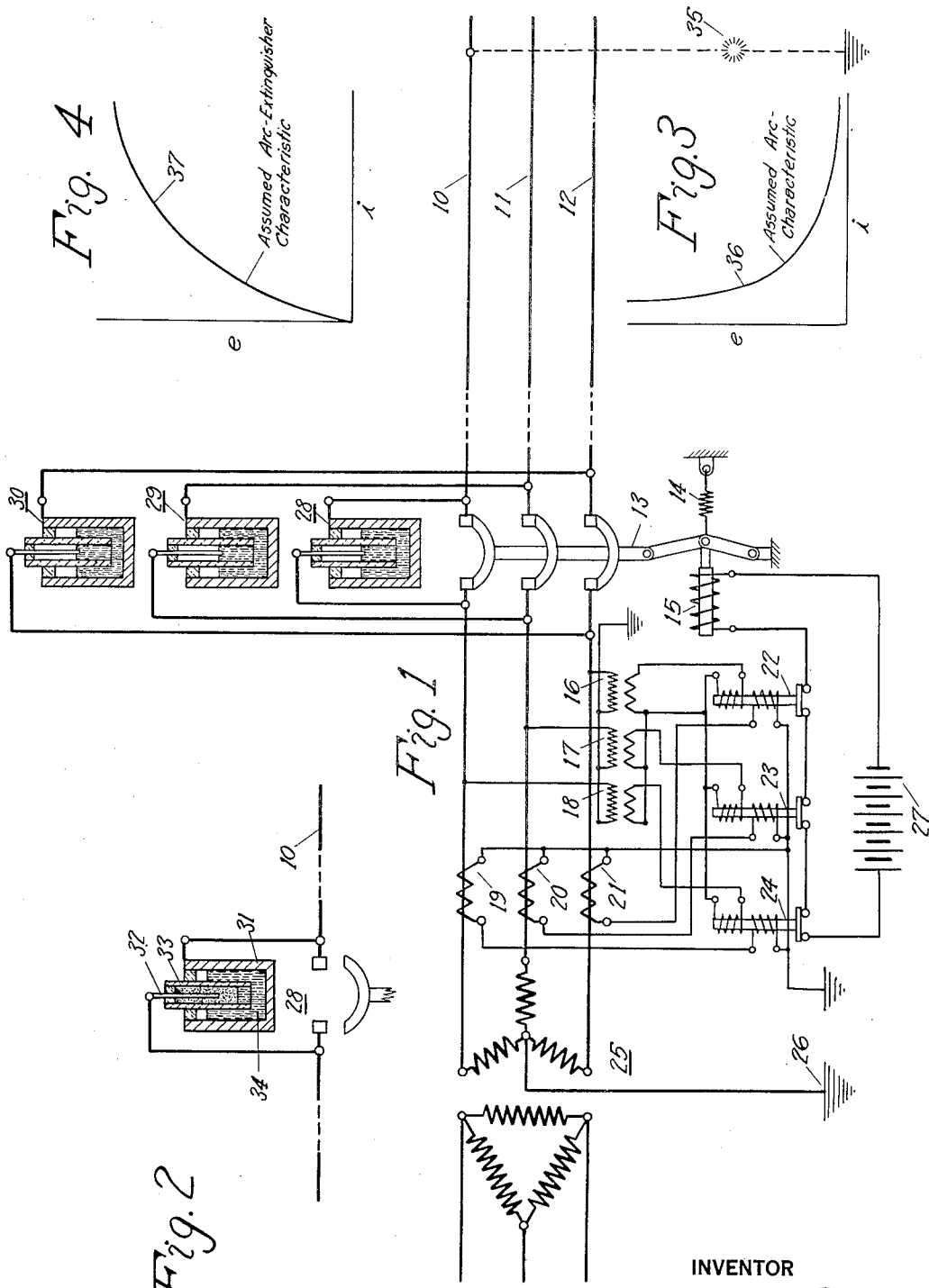

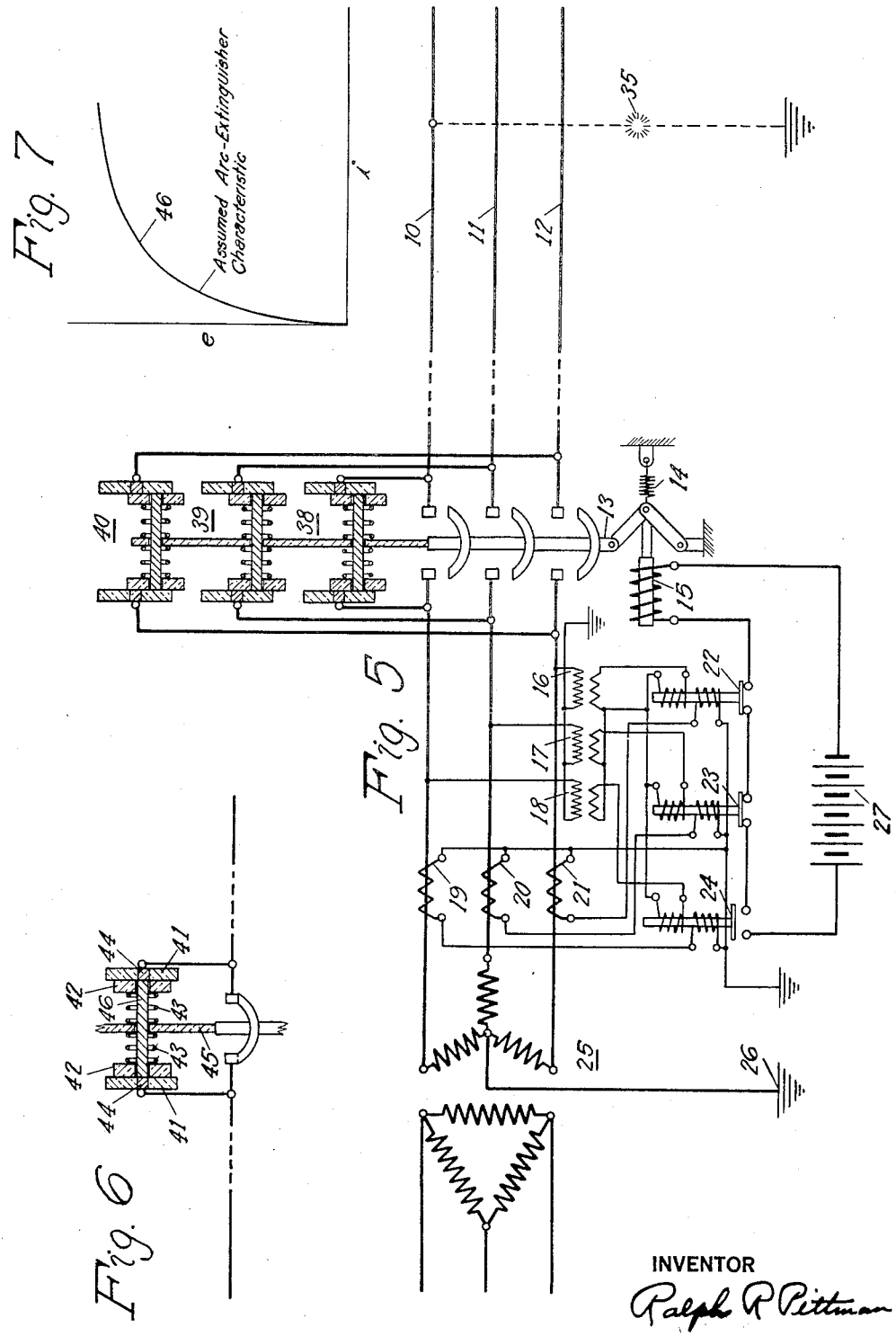

Patented Nov. 28, 1933

1,937,166

UNITED STATES PATENT OFFICE 1,937,166

PROTECTIVE SYSTEM FOR TRANSMISSION LINES

Ralph R. Pittman, Pine Bluff, Ark.

Application November 28, 1932
Serial No. 644,632

4 Claims. (Cl. 175—294)

This invention relates to systems for the protection of electrical transmission and distribution circuits, and is particularly related to protective systems for extinguishing conductor-ground and/or conductor-conductor arcing faults.

Overhead transmission lines are particularly susceptible to arcing faults caused by lightning flashovers, switching surges and swinging conductors. It is well known that such faults, unless quickly extinguished, may not only cause serious damage to the structural parts of the line due to the heat of the arc, but may also cause an instability condition affecting the entire interconnected system. It is also well known that substantially all such arcing faults are due to instantly disappearing causes.

The solution of the problem of extinguishing arcing faults of this character has been attempted in many ways. A number of such methods may be applied only to ground-fault arcs, and such methods are of course only a partial solution of the problem, as it is obvious that conductor to conductor arcs are of a more serious nature than conductor to ground faults. In addition, most of the methods heretofore proposed depend for their operation upon the use of inductances of some kind connected between the electrical neutral of the system and ground, the dimension of such an inductance being such in any particular case as to neutralize, upon the occurrence of a ground fault, the capacity current of the ungrounded conductors. These methods, aside from being expensive, are seriously affected by any switching which changes the length of the line, and this consideration, together with the fact that these methods are of little value for extinguishing conductor to conductor faults, has prevented their general adoption.

Among other methods proposed and the one finding most favor at this time, is that of interrupting the current flow in the affected circuit for a very short time by means of high-speed circuit-reclosing devices. Such a method is quite effective, but the high speeds and high interrupting capacities required (of the order of a few cycles on a 60 cycle alternating current system) to prevent synchronous equipment becoming unstable, make such a method expensive. My invention is directed to a method of arc extinguishment which effectively overcomes the disadvantages above stated.

A specific object of my invention is to provide, in a system of the kind herein described, means for positively extinguishing conductor to ground and/or conductor to conductor arcing faults.

Another object of my invention is to provide means for the extinguishment of transmission line arcing faults whereby the use of high interrupting capacity switching equipment is made unnecessary.

It is a further object to provide, in a transmission line protective system, means for extinguishing a fault-arc by reducing the current in the arc-path to a point such that the voltage available will be less than that required to maintain the arc. The use of this method does not require the complete disconnection of the affected circuit from the source of power, so that connected synchronous machines may have, during the period of abnormal conditions caused by the fault, a substantial component maintaining stability.

It is a further object to provide a system having means dependent upon the abnormal electrical conditions caused by the fault-arc for extinguishing the arc, and a further means dependent upon the extinguishment of the arc for automatically restoring the system to a normal condition.

In the practical application of my invention, I employ arc-extinguishing devices having positive volt-ampere characteristics in series with the negative volt-ampere characteristic of the arc to be extinguished, the term positive as used herein in connection with an electrical arc denoting an increasing voltage with increasing current, the term negative as used herein denoting a decreasing voltage with increasing current. By means of this combination, I attain arc-extinguishing results far superior to any heretofore used, and a much less cost than that of many suggested systems.

Additional objects and advantages will appear from the following specific description and drawings describing in detail certain embodiments of my invention.

In the drawings:

Figure 1 is a diagrammatic representation of an embodiment of my invention, applied to a three-phase alternating-current transmission line.

Fig. 2 is a fragmentary view of a portion of the embodiment shown in Fig. 1, with the circuit-breaker open and the arc-suppressing device operating under an assumed arcing fault condition.

Fig. 3 is a diagram of a curve showing an inherent characteristic of an alternating-current open-air arc.

Fig. 4 is a diagram of a curve showing an inherent characteristic of the arc-suppressing device employed in my invention as shown in Figs. 1 and 2.

Fig. 5 is a diagrammatic representation of an embodiment of my invention, applied to a three-phase alternating-current transmission line, illustrating the system during the period of line-arc-fault extinguishment.

Fig. 6 is a fragmentary view showing in detail the arc-suppressing arrangement employed in Fig. 5.

Fig. 7 is a diagram of a curve showing an inherent characteristic of the arc-suppressing device employed in my invention as shown in Figs. 5 and 6.

Referring now in detail to the drawings, in Fig. 1 the conductors of a three-phase transmission line are shown at 10, 11 and 12. A delta-star transformer arrangement, which may be disposed for connecting the transmission line to a source of power (not shown), is illustrated at 25. While I have here shown this particular type of connection, it is to be understood that my invention may be successfully applied to the other well known types of transformer connections.

For connecting the line conductors 10, 11 and 12 to the transformer bank, I provide the circuit-breaker 13. Relays 22, 23 and 24 are so disposed in relation to the transmission line conductors 10, 11 and 12 by means of the potential transformers 16, 17 and 18, and the current transformers 19, 20 and 21 that an abnormal current-voltage relation or condition, such as may be caused by an arcing fault on the transmission line, will cause the contacts of one or more of the relays 22, 23 and 24 to open. Such an operation deenergizes the closing solenoid 15 of the circuit breaker 13, permitting the spring 14 to pull the circuit-breaker 13 to the open position. Upon the return of normal electrical conditions in the transmission line, it is apparent that a reverse operation ensues; that is, the contact or contacts of the relays 22, 23 and 24 reclose, re-energizing the closing solenoid 15, and in this manner reclosing the circuit-breaker 13.

I will now describe the operation of my invention upon the occurrence of an arcing fault on the transmission line. Assume that a flashover such as may be caused by lightning occurs between conductor 10 and ground or grounded object, causing an arcing fault which may be shown by 35 in Fig. 1. Such an arcing fault has an inherent negative volt-ampere characteristic, as shown in Fig. 3. The voltage between conductor 10 and ground tends to approach the open-air arc-voltage of the fault, and the current in conductor 10 increases above a normal value. This abnormal current and voltage, and the abnormal relation of one to the other, are reproduced in the windings of relays 22, 23 and 24, more particularly in relay 24 through its relation to the line conductor 10 by current transformer 19 and potential transformer 18. In this manner the relay contacts are caused to open, this action deenergizing the solenoid 15, through its disconnection from the battery 27, a condition illustrated in Fig. 5. In the arrangement shown in Figs. 1 and 5, the spring 14 is disposed to open the circuit-breaker 14 upon the disconnection of the closing solenoid 15 from the battery 27 by the opening of any one of the contacts of relays 22, 23 and 24. Obviously other arrangements for actuating the circuit-breaker 13 may be used without departing from the spirit of my invention.

Upon the opening of circuit-breaker 13, the line conductors 10, 11 and 12 are energized only through the arc-suppressors 28, 29 and 30 shown in Fig. 1. The type of arc-suppressor I employ in this embodiment of my invention is shown more in detail in Fig. 2, and consists of a vertically disposed hollow cylinder of insulating material 33, substantially closed at the top end and extending into a metallic chamber 31 partially filled with a conducting liquid. An electrode 32 extends axially into the hollow insulating cylinder 33 to normally contact the conducting liquid and forms one terminal of the device. The other terminal of the device is formed by the metallic chamber 31, so that the current path is from terminal 32 through the liquid to the wall of the chamber 31. A suitable liquid for use in this type of arc-suppressor is a 2-3% of saturated sodium chloride solution in water. It will be apparent that the initial resistance of an arc-suppressor such as I have here described may have a relatively low value, so that the interrupting duty of the circuit-breaker, when shunted by such an arc-suppressor, is considerably less than the duty without such a shunting arrangement. It will also be apparent that the resistance of such an arc-suppressor is a function of the current passing therethrough, since the pressure of the steam generated in the space above the liquid in the cylinder 33 thereby lengthens the current path as indicated in Fig. 2, so that the fault-arc-current is limited to a value dependent to a large extent upon the voltage drop across the arcing fault.

Under such conditions the fault-current in the arcing fault shown at 35 is decreased in accordance with the magnitude of the arcing fault-current. The reduction in arcing-fault current, as will be apparent from the open-air arc characteristic curve 36 in Fig. 3, makes necessary an increased arc-voltage to maintain the arc, but since the arc-voltage is decreased simultaneously with the arc fault current, the arc is extinguished. In this manner, the voltage of the system is varied in a manner to cause arc extinguishment without disconnecting the affected line from the system, and there is always present a component maintaining the stability of synchronous machines connected to the transmission system which, should the affected line be entirely disconnected, might become unstable.

The type arc-suppressor illustrated in Figs. 1 and 2 is not essential to the successful operation of my invention, as any device having a suitable positive volt-ampere arc characteristic as shown by Fig. 4 may be used. I have therefore shown in Fig. 5 another embodiment of my invention, illustrating the use of another type of arc-suppressor. In this device, one pole of which is shown in detail in Fig. 6, the necessary positive volt-ampere arc characteristic is secured by lengthening the arc within a restricted space between flat plates of insulating material. In Fig. 6 the device is shown in detail in the position occupied under normal electrical circuit conditions. Fixed parallel sheets of insulating material 41 mounted in spaced relation are provided with stationary metal contacts 44 extending through the sheets 41 adjacent the midpoint thereof, and forming the line terminals of the device. A movable member adapted for actuation in a direction parallel to and within the spaced sheets 41 is formed by the sheets of insulating material 42, spaced axially apart by the metallic contact member 46 extending through the sheets 42 adjacent the midpoint thereof and adapted to contact, when the device is in the normally closed position, with the terminals 44 of the device. The springs 43 provide resiliency for the device to prevent its destruction by high current magnitudes. For actuating the device, the movable member above described is connected to the circuit-breaker 13 by means of the insulating rod 45.

In operation, the abnormal current and voltage conditions, as explained in connection with Fig. 1, cause the circuit-breaker 13 to open upon the occurrence of an arcing fault on the transmission line. The movement of the circuit-breaker 13 toward the open position actuates the movable contact member of the arc-suppressors 38, 39 and 40. In this manner an arc is drawn from the stationary contact 44 to the movable contact 46, and between the flat stationary sheets 41 and the movable sheets 42. This confinement of the arc changes it from a negative volt-ampere characteristic as illustrated in Fig. 3 to a positive volt-ampere characteristic shown in Fig. 7. The arc is thus stretched in a space between the parallel sheets of insulating material 41 and 42 to a sufficient length to cause the extinguishment of the fault arc, at which time, as explained heretofore, the circuit-breaker is automatically reclosed.

In the above description of my invention, I have referred to arcing faults occurring from conductor to ground. It will be apparent, upon the occurrence of a conductor to conductor fault, whether involving ground or not, that the arcing fault current will be reduced in magnitude through the action of the arc-suppressing devices to extinguish the arcing fault, and that, upon the restoration of normal conditions through the extinguishment of the arcing fault, the system will be automatically restored to its original condition.

It will be seen that the arc-suppressing devices I provide for use with my invention are of a general type in which the current through the devices when operating is substantially in phase with the voltage causing such current. By this means, the arc-suppressing devices have their maximum effectiveness, since the open-air arcing fault to be extinguished also has a substantially in-phase current-voltage relation.

I will now give an illustration of the practical application of my invention. In my application Serial No. 540,602, filed May 28, 1931, titled Wood structure protective means I have described a structural arrangement for the protection of the wooden members of a transmission line structure. As stated in the above described application, this arrangement is intended to make substantially full use of the insulating qualities of the wooden members of the structure to the end that any arcing faults may be as long as possible within the physical limitations of the structure. On a much-used type of H-frame structure for a 110 kv. transmission line, I have found it possible to protect the structure from damage by lightning using open-air arc-gaps from conductor to ground twelve feet in length.

It is now well known that the voltage required to maintain an open-air arc on a 60 cycle alternating-current system is of the order of 300 volts per inch of arc length, assuming an arc-fault current of the order of 1000 amperes. The conductor voltage at the end of an arc from conductor to ground as measured across the 12 foot arc above mentioned, is therefore of the order of 43000 volts above ground under the assumed conditions. The normal voltage to ground on a 110 kv. three-phase system having a solidly grounded electrical neutral is about 66000 volts, and it is thus apparent that this length of arc is not self extinguishing. The physical dimensions required for conductor-to-conductor spacing and conductor-to-ground spacing are so great that it is not economically practical to provide an arc path of sufficient length to be self-extinguishing. The application of my invention reduces the arc-current for an interval of a few cycles to extinguish the fault arc, and immediately following arc-extinguishment, restores normal operating electrical conditions. Arc-lengths of the order above mentioned are of course desirable, as they permit arc-extinguishment with less depression of line voltage than shorter arcing faults, but are not necessary for the operation of my invention, as with shorter length arcs, the arcing fault current is automatically reduced to the value required to extinguish the arcing fault. That it is possible, within the limitations of the physical dimensions of the transmission-line structures, to extinguish arcing faults occurring on a line with a minimum depression of line voltage by means of my invention and a proper transmission-line structural arrangement, is apparent from the above description.

While I have herein described two embodiments of my invention, many others will be obvious to those skilled in this art from my description. One such embodiment might be an arrangement providing separately actuated switches on each conductor of the system. Obviously any relay scheme which will accurately provide selective operation of the circuit-breaker or circuit-breakers may be used. I am fully aware that many modifications of the embodiments shown herein are possible, and my invention is not to be limited except as is necessitated by the prior art and the spirit of the appended claims.

I claim as my invention:

1. A protective system for a polyphase alternating-current transmission line comprising, in combination, a circuit-breaker connecting said line to a system having an electrical neutral at substantially ground potential, electro-responsive relay means disposed to open said circuit-breaker upon the occurrence of an abnormal electrical condition in said line and to substantially instantaneously reclose said circuit-breaker upon the removal of said abnormal electrical condition, arc-suppressing means having a low resistance when connected in parallel with said circuit-breaker and adapted for setting up and elongating an arc within a restricted arc path laterally bounded by insulating material, thereby decreasing but not interrupting the conductor-current upon the occurrence of a conductor-to-ground arcing fault to extinguish said arcing fault, and means depending upon the reclosure of said circuit-breaker for restoring said arc-suppressing means to said low resistance.

2. A system for the extinguishment of arcing faults on an alternating current transmission line comprising, in combination, a circuit-breaker for energizing said line from a source of power, electro-responsive relay means depending upon the occurrence and extinguishment of an arcing fault on said line for respectively opening and closing said circuit-breaker, an arc suppressor connected in parallel relation with said circuit-breaker, said arc suppressor including means controlled by the opening of said circuit-breaker for setting up and elongating an arc within a restricted space laterally bounded by insulating material, whereby the said arcing-fault current is so reduced in magnitude by the increased resistance of said arc suppressor that the available arc-voltage is incapable of sustaining the arcing fault.

3. A system for extinguishing arcing faults on an alternating current transmission line, comprising in combination, a circuit-breaker connecting said line to a source of power, means depending upon the occurrence and extinguishment of an arcing fault on said line for respectively opening and closing said circuit-breaker, an arc-suppressor connected in parallel relation with said circuit-breaker, said arc-suppressor having a low substantially non-inductive resistance when said circuit breaker is closed and including means controlled by the opening of said circuit-breaker for setting up and elongating an arc in series with said arcing fault within a space between the adjacent faces at least two sheets of insulating material resiliently biased one toward the other, whereby the arcing fault is extinguished without completely denergizing said line, and means controlled by the reclosing of the circuit breaker following arc-extinguishment for restoring the arc suppressor to said low resistance condition.

4. The combination with an alternating current transmission line subject to arcing faults, of a circuit-breaker connecting said line to a source of electrical power, means depending upon the occurrence and extinguishment of an arcing fault on said line for respectively opening and closing said circuit-breaker, an arc suppressor connected in parallel relation with said circuit-breaker, said arc suppressor having a low substantially non-inductive resistance when said circuit-breaker is closed and including means controlled by the opening of said circuit-breaker for setting up and elongating an arc within a restricted arc path laterally bounded by insulating material and under pressure conditions not less than atmospheric, whereby arcing faults on said line are extinguished without completely disconnecting said line from said source of power, and means controlled by the reclosing of the circuit-breaker following arc extinguishment for restoring said arc suppressor to said low resistance condition.

RALPH R. PITTMAN.